A. SMITH.
Weed-Turning Attachments for Plows.

No. 151,249.                         Patented May 26, 1874.

Witnesses.
D. P. Cowl
Edmund Masson

Inventor:
Alexander Smith,
By Atty. A. P. Stoughton.

UNITED STATES PATENT OFFICE.

ALEXANDER SMITH, OF ROCKINGHAM COUNTY, NORTH CAROLINA.

IMPROVEMENT IN WEED-TURNING ATTACHMENTS FOR PLOWS.

Specification forming part of Letters Patent No. 151,249, dated May 26, 1874; application filed April 7, 1874.

*To all whom it may concern:*

Be it known that I, ALEXANDER SMITH, of Rockingham county, in the State of North Carolina, have invented certain new and useful Improvements in a Weed-Turning Attachment for Plows; and I do hereby declare the following to be a full, clear, and exact description of the same, reference being had to the accompanying drawings, making a part of this specification, in which—

Figure 1:
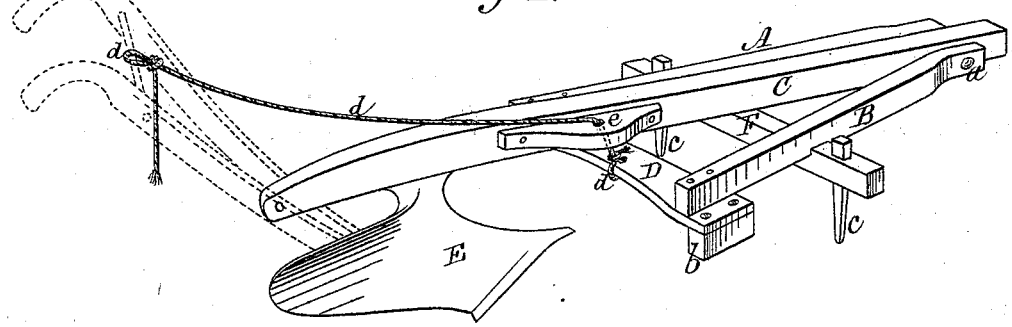
Figure 2:
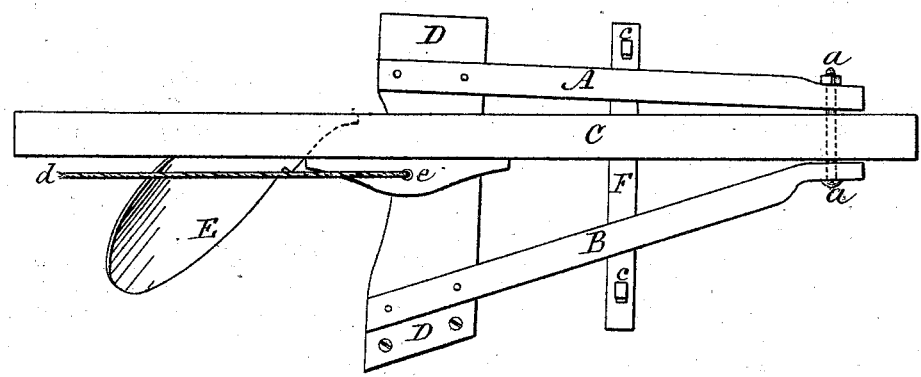

Figure 1 represents, in perspective, my weed-turner as applied to a plow as when in use. Fig. 2 represents a top plan of the same.

My invention relates to an appliance that is readily attached to the beam of any ordinary plow, for the purpose of drawing, directing, or holding the weeds, so as to be caught and covered by the furrow turned by the plow.

To enable those skilled in the art to make and use my invention, I will proceed to describe the same with reference to the drawings.

My weed-turner is composed of two longitudinal pieces, A B, that A being nearly parallel to the plow-beam C, and the other, B, standing off or inclined thereto. These side pieces A B are far enough apart at their front ends, so as to receive the plow-beam C between them, and are bolted to the beam, as at $a$. The rear of the side pieces are connected by a transverse piece, D, upon that end of which next to the mold-board E of the plow there is a block, $b$, which extends down close to or so as to run upon the ground, and the inclination of this block is such as to move the weeds toward the furrow that is being turned by the plow. Centrally of the side pieces A B there is a cross-piece, F, furnished with teeth $a\ a$ to tear up the weeds. The block $b$ moves the weeds toward, and holds them until they are caught by the furrow and so covered up. To the cross-piece D is fastened a line, $d$, which passes up through an eye, $e$, on the beam, and thence extends to the rung or handle of the plow, where it can be readily caught and used by the operator for raising up the weed-turner when the plow is to be backed or turned.

I have shown this weed-turner as applied to a right-hand plow. It can just as readily be constructed and applied to a left-hand plow, the purpose in both being the same—namely, to move the weeds toward, and hold them so as to be covered by, the furrow, whichever way that furrow may be turned.

What I claim is—

The weed-turner composed of the side and cross-pieces A B D F, in combination with the block $b$ and teeth $c$, and attached to and operated in connection with a plow, as and for the purpose described and represented.

ALEXANDER SMITH.

Witnesses:
W. D. STOCKS,
W. H. MARTIN.